United States Patent
Pettersen et al.

(10) Patent No.: US 8,215,360 B2
(45) Date of Patent: Jul. 10, 2012

(54) VACUUM BAG FRAME ASSEMBLY FOR THE MANUFACTURING OF FIBRE-REINFORCED COMPOSITE PANELS

(75) Inventors: Bjørn Pettersen, Kråkerøy (NO); Pål Francis Hansen, Vesterøy (NO)

(73) Assignee: Frec Technology AS, Fredrikstad (NO)

( * ) Notice: Subject to any disclaimer, the term of this patent is extended or adjusted under 35 U.S.C. 154(b) by 943 days.

(21) Appl. No.: 12/155,673

(22) Filed: Jun. 6, 2008

(65) Prior Publication Data
US 2008/0314497 A1    Dec. 25, 2008

Related U.S. Application Data

(63) Continuation of application No. PCT/NO2008/000175, filed on May 20, 2008.

(60) Provisional application No. 60/924,984, filed on Jun. 7, 2007.

(51) Int. Cl.
B32B 37/10    (2006.01)

(52) U.S. Cl. ............ 156/382; 156/583.3; 425/389; 425/390; 425/393; 425/403; 425/405.1; 425/405.2; 100/269.02; 100/269.03; 100/269.04

(58) Field of Classification Search .......... 156/285, 156/381, 382, 583.3; 425/389, 390, 405.1, 425/405.2, 403; 100/269.02–269.04
See application file for complete search history.

(56) References Cited

U.S. PATENT DOCUMENTS

| | | | | |
|---|---|---|---|---|
| 5,156,795 A | * | 10/1992 | Harvey et al. | 264/510 |
| 5,648,109 A | * | 7/1997 | Gutowski et al. | 425/504 |
| 6,497,786 B1 | * | 12/2002 | Kilgore et al. | 156/379.8 |

FOREIGN PATENT DOCUMENTS

| | | |
|---|---|---|
| EP | 0 202 041 A2 | 11/1986 |
| EP | 0 405 261 A2 | 1/1991 |
| EP | 0 410 599 A2 | 1/1991 |
| FR | 2 689 809 | 10/1993 |
| NO | 316296 B1 | 10/2003 |
| WO | WO-01/41993 A2 | 6/2001 |
| WO | WO-02/02299 A1 | 1/2002 |
| WO | WO-03/086748 A1 | 10/2003 |

* cited by examiner

*Primary Examiner* — Christopher Schatz
(74) *Attorney, Agent, or Firm* — Birch, Stewart, Kolasch & Birch, LLP

(57) ABSTRACT

A solution to some of the problems related to manufacturing of fiber-reinforced composite panels is to provide a vacuum bag frame assembly for use in the production of fiber-reinforced composite panels, where the vacuum bag frame assembly comprises a tubular center frame, a first vacuum bag frame holding an integrated first vacuum bag and arranged for closing against a first side of the center frame, and a second vacuum bag frame holding a second integrated vacuum bag and arranged for closing against an opposite, second side of the tubular center frame. The tubular center frame is provided with a peripherally arranged vacuum outlet external relative to the space formed between the vacuum bags, and one or more vacuum apertures directed internally relative to the space formed between the first and second vacuum bags and the tubular center frame.

6 Claims, 7 Drawing Sheets

VACUUM BAG FRAME ASSEMBLY FOR THE MANUFACTURING OF FIBRE-REINFORCED COMPOSITE PANELS

This application is a Continuation of co-pending International Application No. PCT/NO2008/000175, filed on May 20, 2008, and for which priority is claimed under 35 U.S.C. §120. This application also claims the benefit of U.S. Provisional Application No. 60/924,984, filed on Jun. 7, 2007 under 35 U.S.C. §119(e) and Application No. NO20072912, filed in Norway on Jun. 7, 2007 under 35 U.S.C. §119(a)-(d). The entire contents of all of the above applications are hereby incorporated by reference.

INTRODUCTION

The present invention relates to manufacturing of fibre-reinforced composite panels. In the art of manufacturing fibre-reinforced composite panels a mould is used for supporting a composite lay-up comprising a removable slip film, a layer of reinforcement fibres, another slip film, a removable breather cloth, and a unilaterally arranged vacuum bag having a seal against a flange on the mould. Resin may be injected under vacuum or integrated as dry thermoplastic fibres in the layer of reinforcement fibres, and the composite lay-up may be baked in an oven. If the mould is to be integrated as a part of the composite product, the mould to be integrated may be added a composite layer on one side at a time, which is time-consuming and provides an inhomogenous rim around the integrated mould. An alternative is to envelope the integrated mould wrapped in the composite lay-up, evacuate it in an integral vacuum bag and baking it in the oven, one at a time. Using an integral vacuum bag around each product lay-up may be inefficient and may incur shrinking and displacement of fibres near the edges of the integrated mould.

BACKGROUND ART

A frame with a unilateral vacuum bag with an integral seal arranged for sealing against a mould table flange corresponding to the frame is known in the background art.

FR2689809 describes a vacuum bag assembly for enveloping a composite lay-up between the two vacuum bags. The vacuum bag assembly is arranged for vacuum draping an external mould.

WO 01/41993 describes a double vacuum bag vacuum infusion process. The patent application describes a lay-up arranged between the vacuum bags, and further that the vacuum bags with the lay-up being draped over an external mould on a flat table.

EP1492664 describes a single sided vacuum bag frame for a lay-up in a mould.

A disadvantage related to the use of a single-sided vacuum bag is that it may be difficult to envelope the mould as a core in the composite product, and a consequence of this may lead to the requirement of conducting the moulding process twice for completing the two faces of the composite product. Another disadvantage of prior art is that the draping of composite fibres over the edge of the mould may be displaced with regard to the position of the fibres near the edge when using a single sided vacuum bag or an external mould. A composite having displaced fibres near the edge may be subject to uneven wear and may delaminate. A single sided vacuum bag or external mould may also result in a tension in the vacuum bag during vacuum pumping leading to a non-uniform pressure near edges of the mould, incurring corresponding undesired variation in matrix thickness.

A disadvantage of the vacuum bags according to background art is that the vacuum bag frames may be displaced during assembly and vacuum pumping. The double frames may also be displaced or disturbed during handling to and from the furnace.

SHORT SUMMARY OF THE INVENTION

A solution to some of the problems related to manufacturing of fibre-reinforced composite panels is to provide a vacuum bag frame assembly for use in the production of fibre-reinforced composite panels, said vacuum bag frame assembly comprising a tubular centre frame, a first vacuum bag frame holding an integrated first vacuum bag and arranged for closing against a first side of the centre frame, and a second vacuum bag frame holding a second integrated vacuum bag and arranged for closing against an opposite, second side of said tubular centre frame. The tubular centre frame is provided with a peripherally arranged vacuum outlet external relative to the space formed between the vacuum bags, and one or more vacuum apertures directed internally relative to the space formed between said first and second vacuum bags and said tubular centre frame.

SHORT FIGURE CAPTIONS

The invention is illustrated in the accompanying drawing figures, wherein said figures shall not be construed as limiting to the invention.

FIG. 1 is an exploded section view of a vacuum bag frame assembly according to the invention, illustrated with a lay-up for a composite fibre-reinforced thermoplastic product including an integrated mould and textiles having antiballistic properties.

FIG. 2a is a section view of the same vacuum bag frame assembly according to the invention in which the composite lay-up has been evacuated for air so as for the first and second vacuum bag to bilaterally drape and compress the lay-up to envelope the integrated mould. FIG. 2b is an expanded cross section view of part of the composite lay-up between the first and the second vacuum bag. FIG. 2c illustrates a cross-section of the final product in which the two enveloping fibre-reinforced thermoplastic layers have merged to one enveloping layer around the integrated mould and the lay-up of fibres.

EMBODIMENTS OF THE INVENTION

Figure 1:
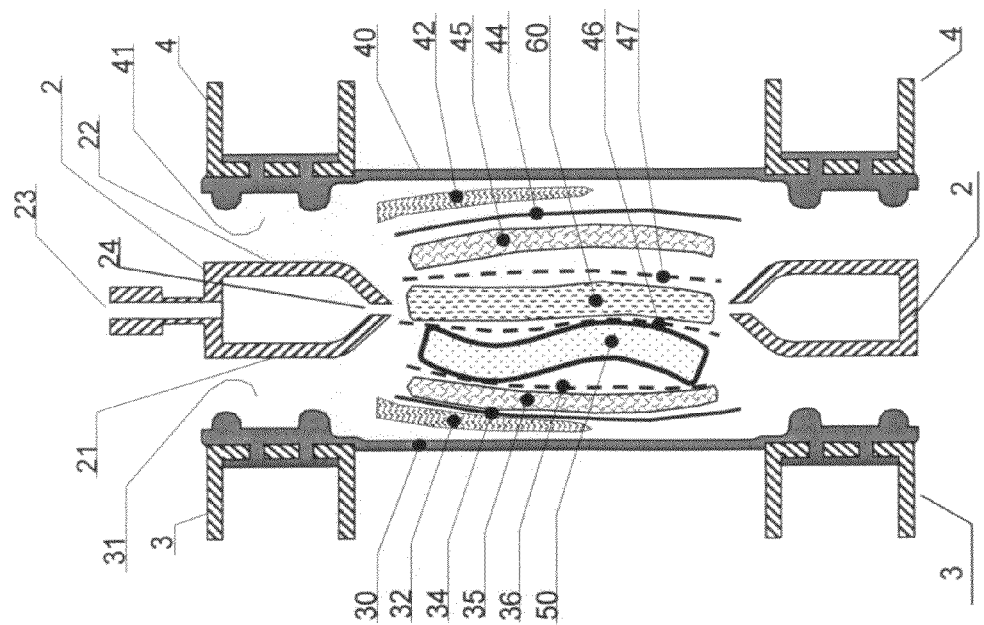

FIG. 1 is an exploded section view of a vacuum bag frame assembly according to the invention, illustrated with a lay-up for a composite fibre-reinforced thermoplastic product including an integrated mould and textiles, said textiles providing antiballistic properties. A vacuum bag frame assembly (1) according to the invention is made for use in the manufacturing of fibre-reinforced composite panels. The vacuum bag frame assembly (1) comprises the following main features: A rigid, tubular centre frame (2), a first, rigid vacuum bag frame (3) is arranged for holding and spanning a perimeter of a first vacuum bag (30), and a similar and oppositely arranged second, rigid vacuum bag frame (4) arranged for spanning a perimeter of a corresponding second vacuum bag (40). The tubular centre frame (2) is provided with a vacuum inlet from the internal of the assembly and an outlet to a vacuum pump. The inlet from the internal of the assembly may be a series of holes or a gap extending along the inward facing side of the centre frame (2). The vacuum bag frame assembly (1) is arranged for holding a composite lay-up. In one embodiment of the invention the vacuum bag frame assembly shall comprise an integrated mould. The mould may be arranged for being integrated in said moulded composite lay-up during the vacuum baking process. In another embodiment the mould will not form part of the product and is arranged for being removed from the moulded composite product after vacuum baking. A proposed lay-up of the composite to be vacuum-moulded will be described below.

Figure 2B:
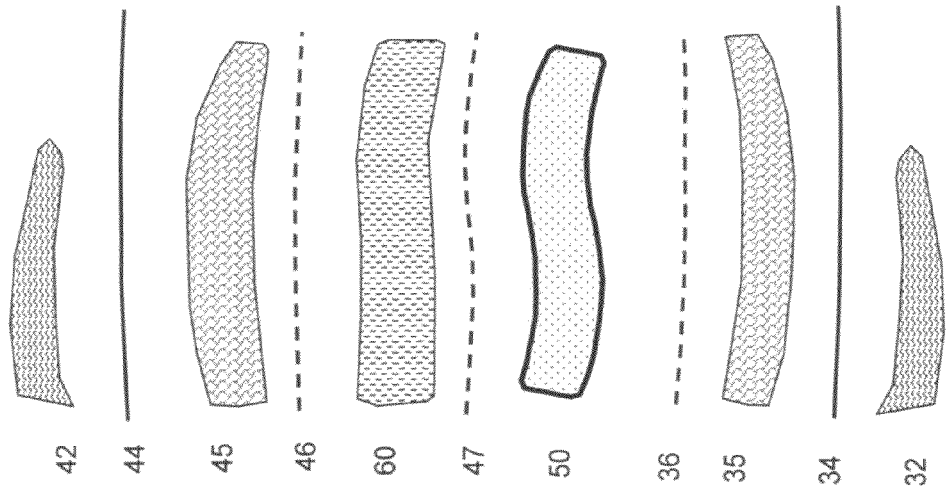
Figure 2A:
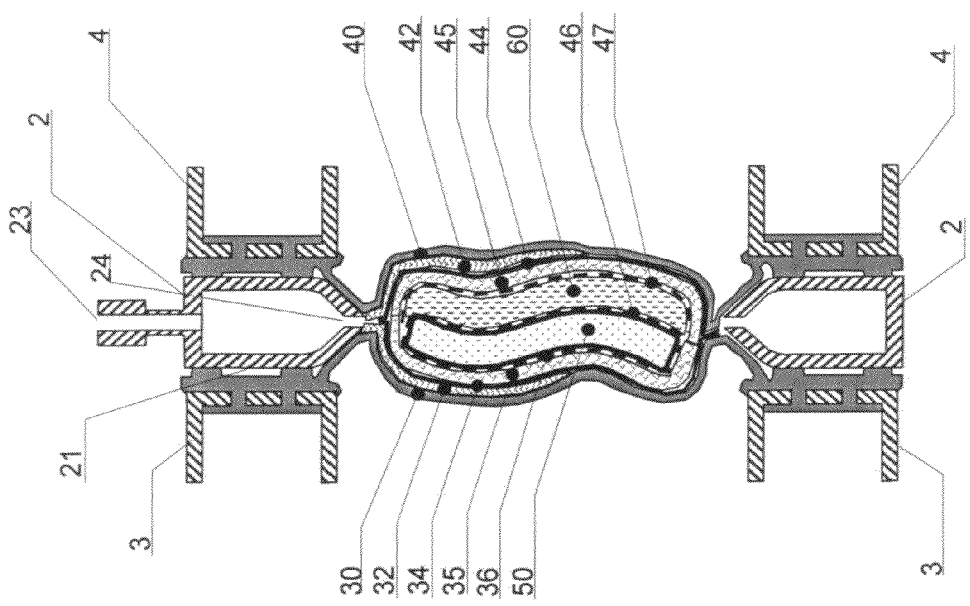

FIG. 2a is a section view of the same vacuum bag frame assembly according to the invention in which the composite lay-up has been evacuated for air so as for the first and second vacuum bag (30, 40) to bilaterally drape and compress the lay-up to envelope the integrated mould.

Figure 3:
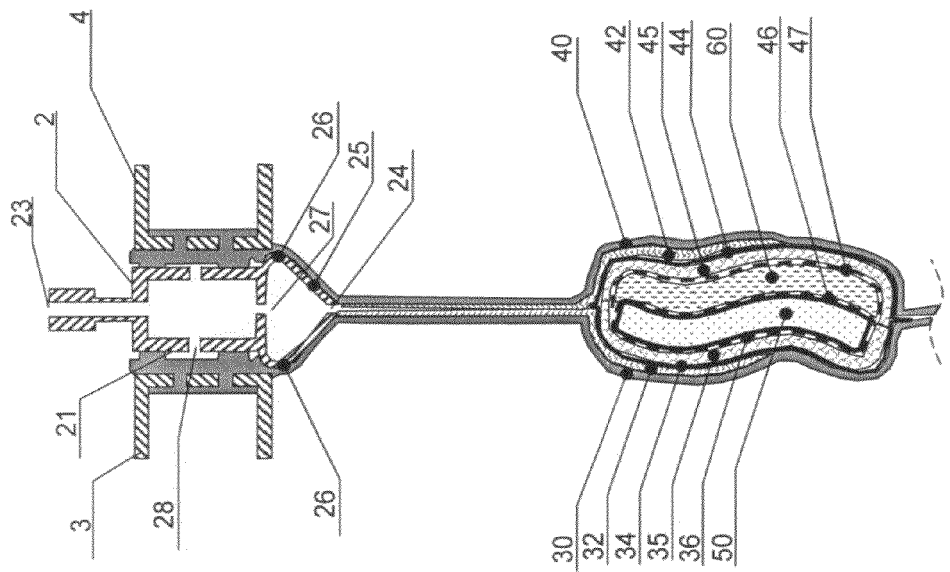
FIG. 3 is a section view of a detail of the vacuum-pumped assembled vacuum bag assembly according to the invention, illustrating in the upper portion of the figure a section of the tubular centre frame and the first and second vacuum bag frames, and in the lower portion of the figure an edge portion of an integrated mould draped bilaterally by a lay-up of reinforcement and thermoplastic fibres.
Figure 4:
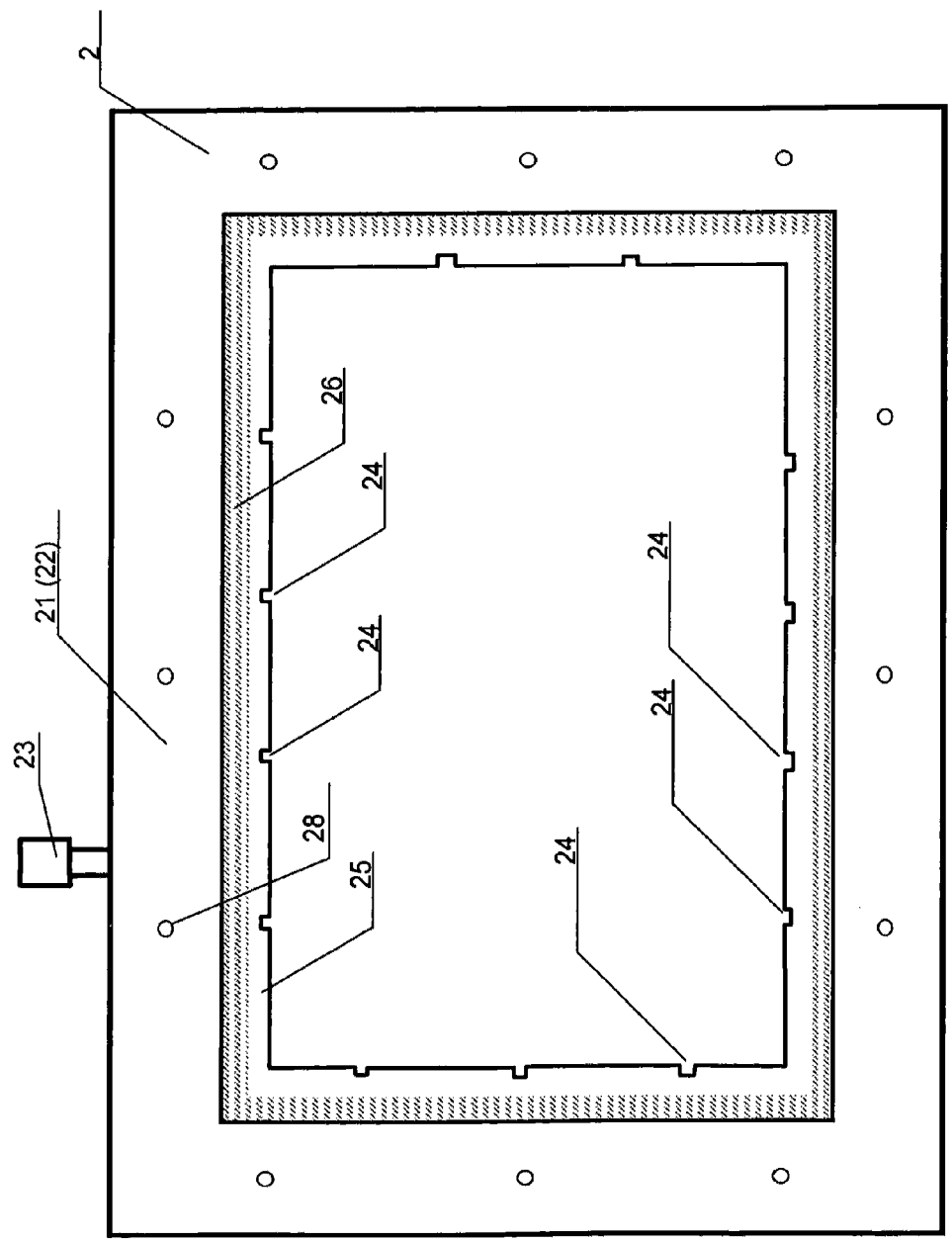
FIG. 4 is an elevation view of the tubular centre frame according to the invention.
Figure 5:
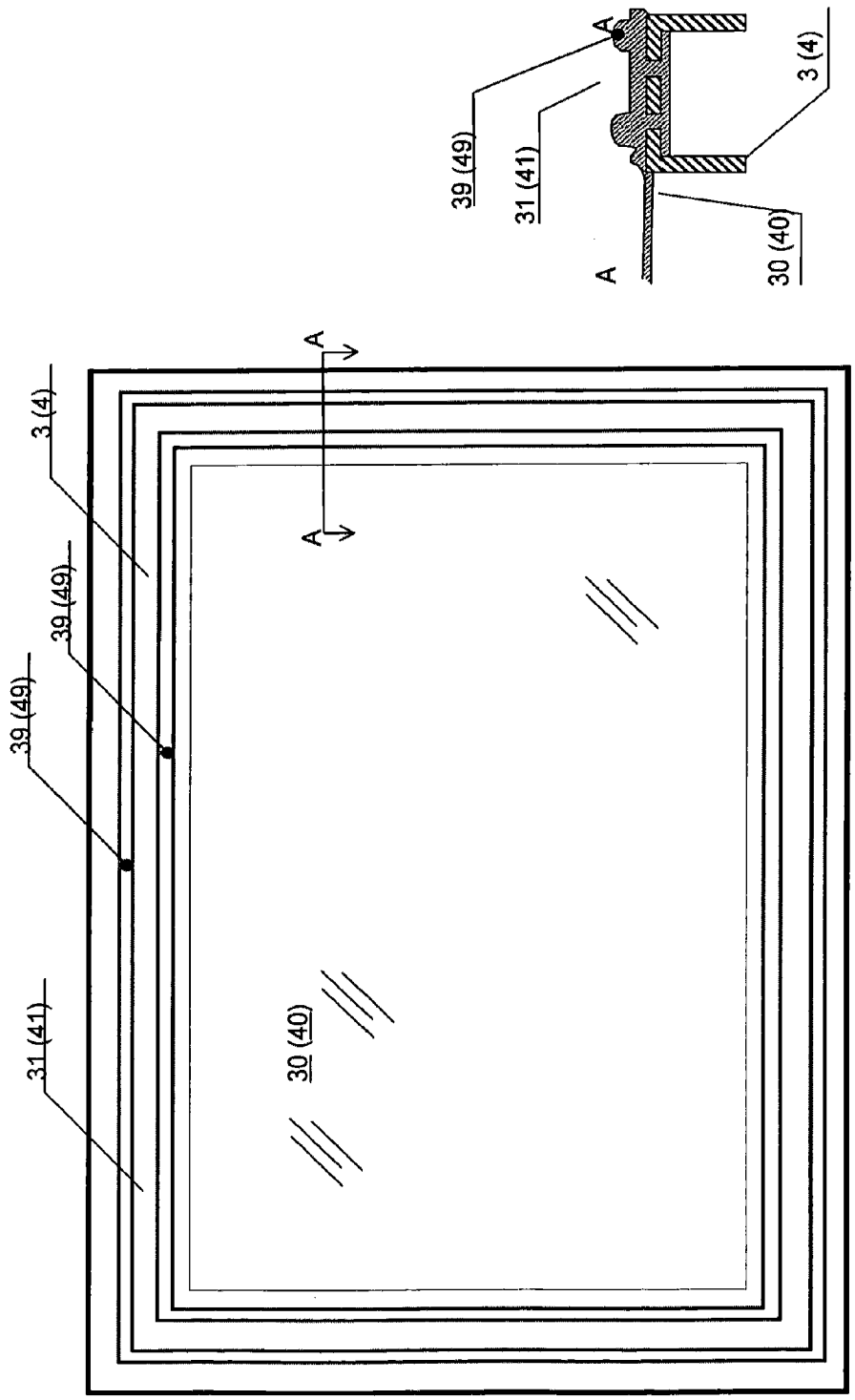
FIG. 5a is an elevation view of either of the vacuum bag frames according to the invention, as seen from the gasket-bearing side which shall encounter the central frame.
FIG. 5b is a section of an embodiment of the frame with the integrated vacuum bag and gasket ribs moulded onto the rigid frame.

As is shown in FIG. 3 and in FIG. 4, the rigid, tubular centre frame (2) has a first flange surface (21) and a second flange surface (22) at an opposite side of the centre frame relative to said first flange surface (21). FIG. 5a shows a first, rigid vacuum bag frame (3) arranged for holding and spanning a perimeter of a first vacuum bag (30). The first vacuum bag (30) has a first flange gasket (31) arranged for closing against said first flange surface (21) of the centre frame (2). Further, the vacuum bag frame assembly comprises a similar second, rigid vacuum bag frame (4) arranged for spanning a perimeter of a corresponding second vacuum bag (40). The second vacuum bag (40) has a second flange gasket (41), please see FIG. 5a, arranged for closing against said second flange surface (22) of the centre frame (2).

As illustrated in FIG. 4 and in FIG. 3, the rigid, tubular centre frame (2) is provided with one or more vacuum inlets from the internal of the assembly and an outlet to a vacuum pump. Specifically, a first, peripherally arranged vacuum outlet (23) is arranged external relative to said first and second flange gaskets (31, 41), please see FIG. 1, for connection to the vacuum pump. One or more second vacuum apertures (24) are directed internally relative to said first and second flange gaskets (31, 41), arranged for evacuating air from a space formed between said first and second vacuum bags (30, 40) and said tubular centre frame (2). The embodiment having an external vacuum outlet (23) arranged on the hollow centre frame (2) is mechanically more stable than the background art having vacuum outlets directly from the vacuum bag. Having the vacuum outlet through the vacuum bag often incurs leakages due to bending end tensioning from the connected vacuum hoses.

FIG. 2a is a section view of the vacuum bag frame assembly according to the invention in which the composite lay-up has been evacuated so as for the first and second vacuum bag (30, 40) to bilaterally drape and compress the lay-up to envelope the integrated mould (50). Please notice that the first and second vacuum bags (30, 40) are free to follow and drape the edge of the mould and the fibre cloth lay-up, and also able to exert an edge-on pressure, better than a single one-sided vacuum bag is capable of laid against a static mould form. The central frame (2) and the vacuum bag frames (3, 4) are preferably, but not necessarily planar.

FIG. 2b is an expanded section view of part of an embodiment of a composite lay-up (70) arranged between the first and the second vacuum bag according to the invention. The composite lay-up (70) illustrated is a so-called dry lay-up for making a composite product, and may comprise the following components:

- a first, removable breather cloth (32) for leading air from the lay-up to the vacuum apertures (24) of the central frame (2);
- a first disposable slip film (34) so as for releasing the baked lay-up from the enveloping vacuum bags (30, 40);
- a first, dry fibre layer (35) of one or more sheets of composite reinforcement and thermoplastic fibres;
- a first, optional adhesive film (36) for binding the fibre layer (35) to a subsequent integrated mould (50);
- the above-mentioned integrated mould (50);
- a second, optional, adhesive film (46) for binding the integrated mould (50) to a subsequent layer;
- a lay-up of fibres (60), possibly interfoliated with glue nets or thin binder films,
- a third, optional, adhesive film (47) for binding the fibres (60) to a subsequent layer,
- a second, dry fibre layer (45) of composite reinforcement and thermoplastic fibres,
- a second, disposable, slip film (44), and,
- a second, optional, removable breather cloth (42).

The integrated mould (50) may in one embodiment be an antiballistic ceramic plate shaped to fit a body part. Likewise, the fibres (60) may be of an antiballistic type. With such a lay-up, an antiballistic panel is formed.

Figure 2C:
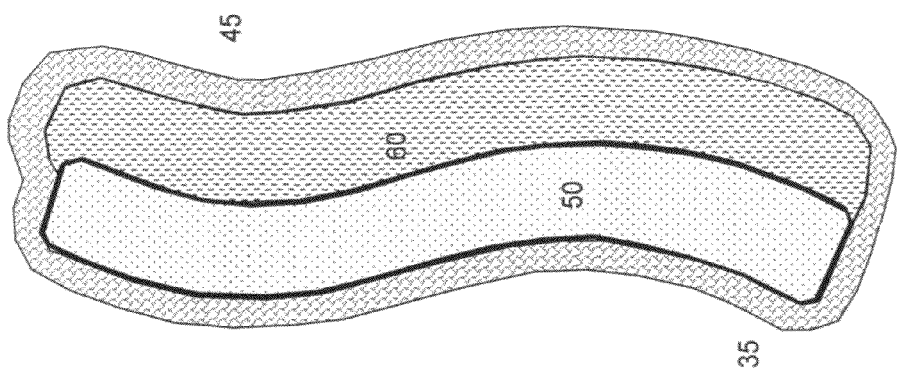

FIG. 2c illustrates a cross-section of the final product. In the cross-section, the two enveloping fibre-reinforced thermoplastic layers have merged to one enveloping layer around the integrated mould (50) backing the lay-up (60) of fibres, preferably generally dry antiballistic fibres in order to improve the antiballistic properties. Notice that as a result from the good draping capabilities of the first and second vacuum bags (30, 40) to follow the edge of the mould and the fibre cloth lay-up, and also able to exert an edge-on pressure, and depending on the fibre-reinforced thermoplastic layers have been precisely cut and laid, the FRTP rim around the edge of the mould (50) and the antiballistic fibres (60) will be continuous as illustrated here, and protect the edge and prevent wear and possible delamination.

FIG. 3 is a section view of a detail of the vacuum-pumped assembled vacuum bag assembly according to the invention, illustrating in the upper portion of the drawing a section of the tubular centre frame (2) and the first and second vacuum bag frames (3, 4), and in the lower portion of the drawing an edge portion of an integrated mould (50) draped bilaterally by a lay-up of reinforcement and thermoplastic fibres. The rigid tubular centre frame (2) illustrated further comprises a tubular, auxiliary centre frame (25) attached onto and preferably within an inner perimeter of the rigid tubular centre frame (2). The auxiliary frame (25) is made to be in vacuum communication via auxiliary evacuation apertures (27) with the surrounding centre frame (2). The auxiliary frame provided with said vacuum apertures (24) along the inner rim portion extending inwards between the vacuum bags when assembled and holding the composite lay-up.

The auxiliary centre frame (25) illustrated in FIG. 3 according to an embodiment of the invention has a cross-section larger than the cross-section width of the centre frame (2), i.e. wider than a separation between said first and second flange surfaces (21, 22). The auxiliary centre frame (25) has a generally triangular cross-section and is arranged for forming a shoulder (26) for positioning and holding said first and second rigid vacuum bag frames (3, 4) in place during an assembly process, and for preventing the gaskets (31, 41) from being displaced during vacuum pumping and subsequent handling in the heating and cooling process.

FIG. 4 is an elevation view of the tubular centre frame according to the invention. FIG. 5a is an elevation view of either of the vacuum bag frames according to the invention, as seen from the gasket-bearing side which shall encounter the central frame. FIG. 5b is a section of an embodiment of the frame with the integrated vacuum bag and gasket ribs moulded onto the rigid frame. Gasket vacuum outlets (28) may be formed in the central frame flange surface (21,22), please see the assembled cross-section in FIG. 3 and the side elevation view in FIG. 4, arranged for communicating with a space formed during assembly of the central frame between two or more parallel gasket ribs on the gasket surface (31, 41) of the vacuum frame, please see FIGS. 5a and 5b.

Figure 6:
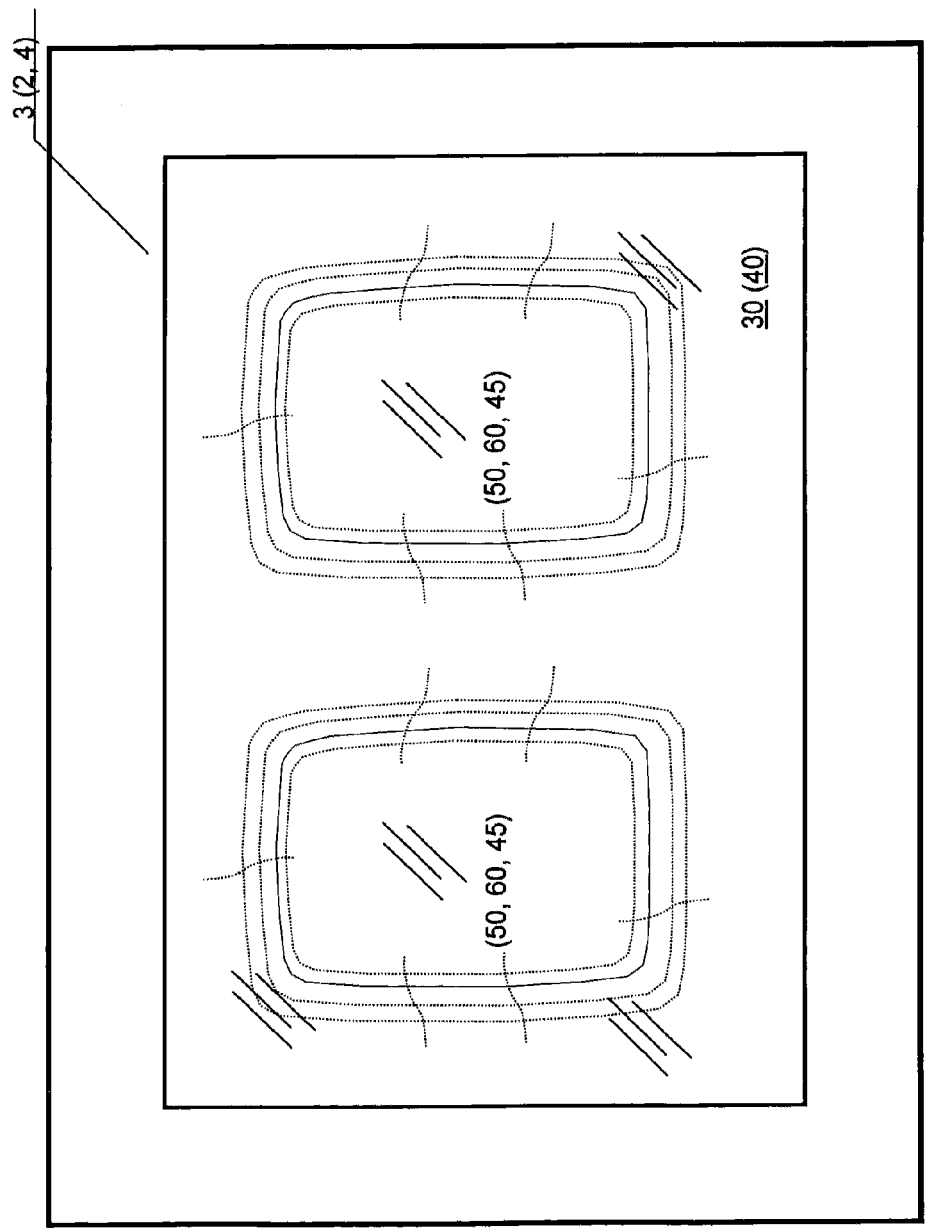
FIG. 6 is an external elevation view of a complete and evacuated vacuum bag assembly according to the invention, with the outline indicative of an integral mould with a composite lay-up.

FIG. 6 is an external elevation view of a complete and evacuated vacuum bag assembly according to the invention, with the outline indicative of an integral mould with a composite lay-up.

The integrated mould (50) has a perimeter generally smaller than and fitting generally within the perimeter of said tubular centre frame (2). In an embodiment of the invention the vacuum bag frame assembly (1) may envelope an array of two, four, six or any number of separate integrated moulds (50), each carrying their separate lay-up to be vacuum moulded. Each mould (50) may be arranged flexibly held by and held between said first and second vacuum bags (30, 40). The integrated mould (50) may have a 3-D shape with a dimension extending out of the plane formed by the otherwise empty vacuum bags (30, 40), and may even provide some undercut, because undercut will not provide a significant problem as the vacuum bag material is highly flexible and easily removed from the final product. The integrated mould (50) should be a rigid piece of material having the desired base shape of the composite product to be formed. As mentioned above, the integrated mould (50) may form a base for forming and being draped by a lay-up of antiballistic fibres (60). Thus the integrated mould may have antiballistic properties in itself, such as one or more antiballistic ceramic tiles, or a plate of hardened steel or hardened aluminium, or a combination thereof. One of the important features of the vacuum bag frame assembly of the invention is that the vacuum bags are literally very flexible and may very closely drape even rather angled mould forms with significant fidelity. Using the vacuum bag frame assembly one may thus manufacture not only doubly curved antiballistic chest panels and back panels and shoulder plates, but also more complex shapes as antiballistic front upper chest/neck shields for personnel to be protected, and complexly formed antiballistic panels for following the shape of car body parts for cars to be antiballistically protected.

Figure 7:
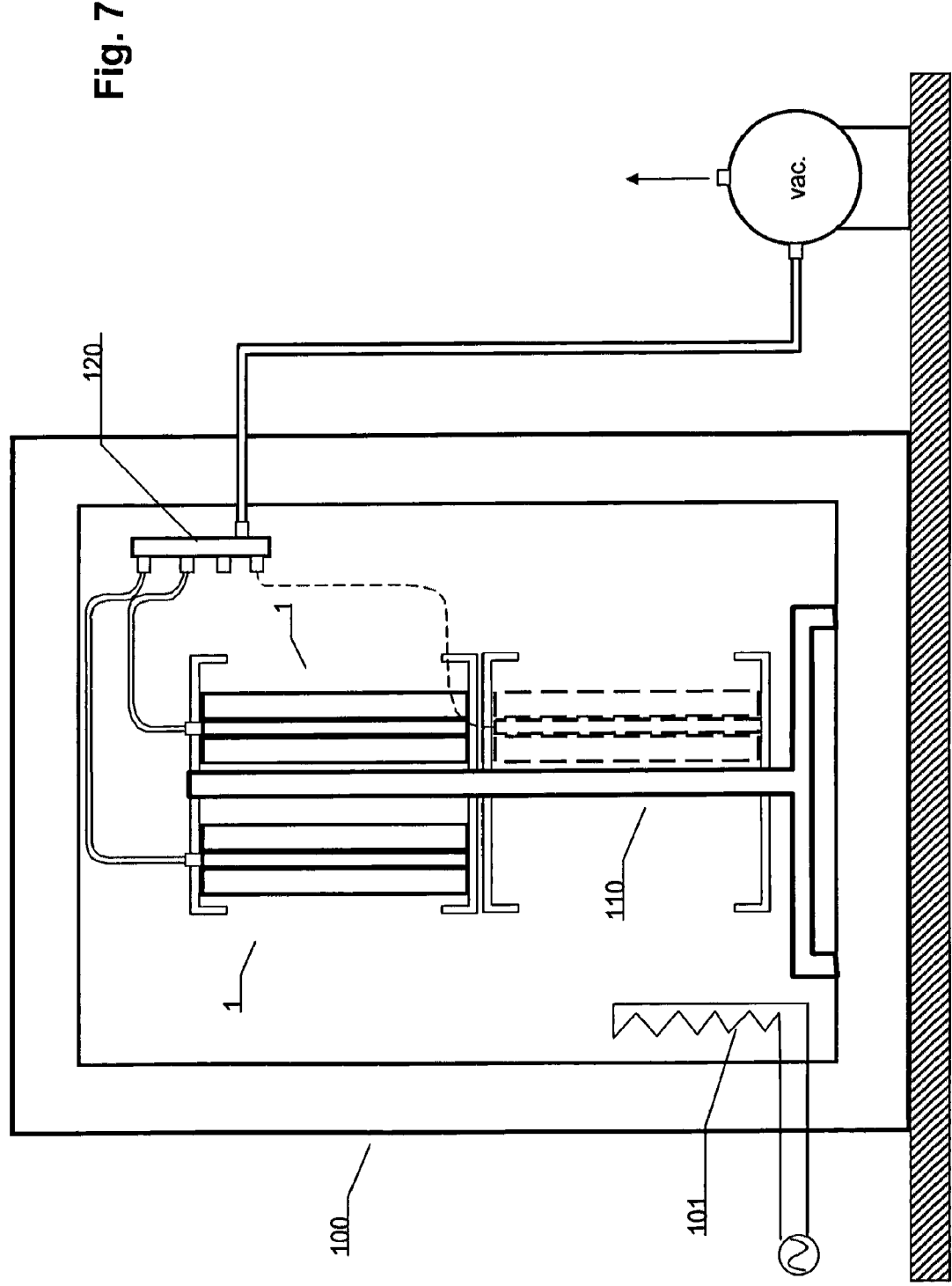
FIG. 7 is a front elevation view of a furnace with an internal rack for vacuum bag assemblies according to the invention, and with a vacuum manifold for connecting several vacuum bag assemblies to a common vacuum pump.

In general, the heating process may be conducted in a large furnace (100) and heated by an electrical heat element (101), as illustrated in FIG. 7, in which one or more vacuum bag frame assemblies (1) are arranged in a rack (110) and connected to a vacuum manifold (120) connected to a vacuum pump. The heating and hold temperature must be above a required melting temperature for the thermoplastic component of the composite lay-up if using a thermoplastic process. The temperature will normally be above 100 degrees Celsius, and the entire vacuum bag system should tolerate a temperature of about 300 degrees Celsius. If vacuum injection moulding and chemical hardening is used, the vacuum bag assembly should work cold as well.

The invention claimed is:

1. A vacuum bag frame assembly for use in the manufacture of fibre-reinforced composite panels, said vacuum bag frame assembly comprising:
    a first, rigid vacuum bag frame spanning a first vacuum bag, the first vacuum bag having a first flange gasket;
    a second, rigid vacuum bag frame spanning a second vacuum bag, the second vacuum bag having a second flange gasket;
    a rigid, tubular centre frame including a first flange surface and a second flange surface, the second flange surface being arranged at an opposite side relative to the first flange surface, wherein the first and second rigid vacuum bag frames are offset from and symmetrically arranged about the rigid tubular centre frame before the air is evacuated from the vacuum bag frame assembly; and
    an integrated mould having a perimeter within the tubular centre frame and arranged to be flexibly supported by and held between the first and second vacuum bags,
    wherein said first flange gasket is configured to bear against the first flange surface and the second flange gasket is configured to bear against the second flange surface after the air is evacuated from the vacuum bag frame assembly,
    wherein said rigid, tubular centre frame comprises:
    a first, peripherally arranged vacuum outlet external relative to said first and second flange gaskets;
    one or more second vacuum apertures directed internally relative to said first and second flange gaskets and arranged for evacuating a space formed between said first and second vacuum bags and said tubular centre frame; and
    a tubular, auxiliary centre frame extending radially inward from an inner perimeter of said rigid tubular centre frame, said auxiliary centre frame being in vacuum communication with said surrounding tubular centre frame, said auxiliary centre frame being provided with said second vacuum apertures, said auxiliary centre frame having a cross-section in a first direction larger than a separation between said first and second flange surfaces in said first direction and thus forming shoulders for positioning and maintaining the relative position of said first and second rigid vacuum bag frames.

2. The vacuum bag frame assembly of claim 1, wherein said auxiliary centre frame has a generally triangular cross-section.

3. The vacuum bag frame assembly of claim 1, wherein said integrated mould is arranged as an integrated part in a composite lay-up, said composite lay-up comprising:
    a first, removable breather cloth;
    a first disposable slip film;
    a first, dry fibre layer of composite reinforcement and thermoplastic fibres;
    a first adhesive film;
    an integrated mould;
    a second adhesive film;
    a lay-up of antiballistic fibres;
    a third adhesive film;

a second, dry fibre layer of composite reinforcement and thermoplastic fibres;

a second, disposable, slip film; and a second removable breather cloth.

4. The vacuum bag frame assembly of claim 1, wherein said integrated mould is arranged as an integrated part in a composite lay-up, said composite lay-up comprising:

a first disposable slip film;

a first, dry fibre layer of composite reinforcement and thermoplastic fibres;

an integrated mould;

a lay-up of antiballistic fibres;

a second, dry fibre layer of composite reinforcement and thermoplastic fibres; and a second, disposable, slip film.

5. The vacuum bag frame assembly of claim 1, said integrated mould has a 3-dimensional shape with a dimension extending out of the plane formed by the otherwise empty vacuum bags.

6. The vacuum bag frame assembly of claim 1, wherein the first and second flange surfaces of the rigid, tubular centre frame further comprises a plurality of gasket vacuum outlets arranged for communication with the first and second flange gaskets, respectively.

* * * * *